Patented Aug. 8, 1939

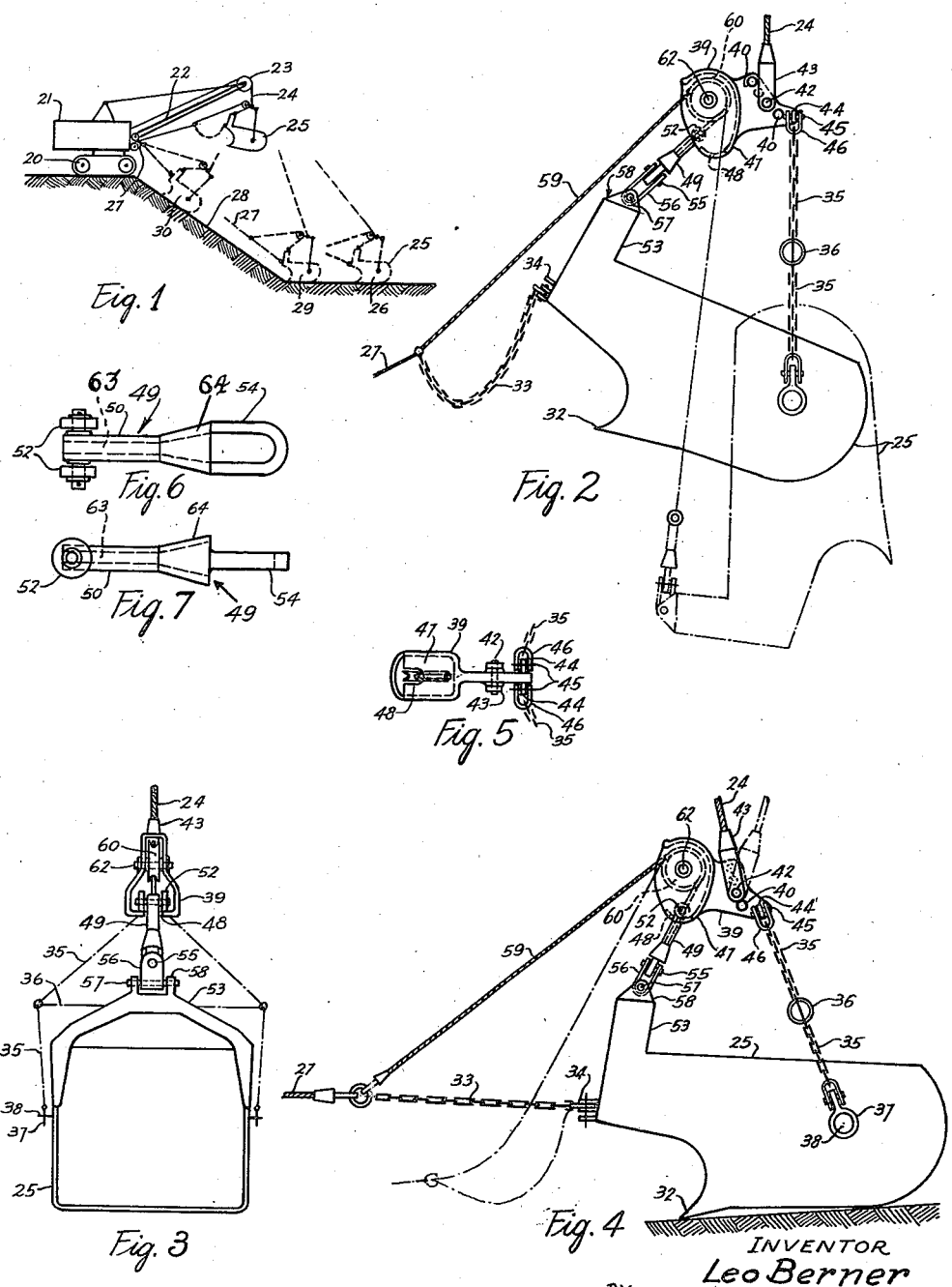

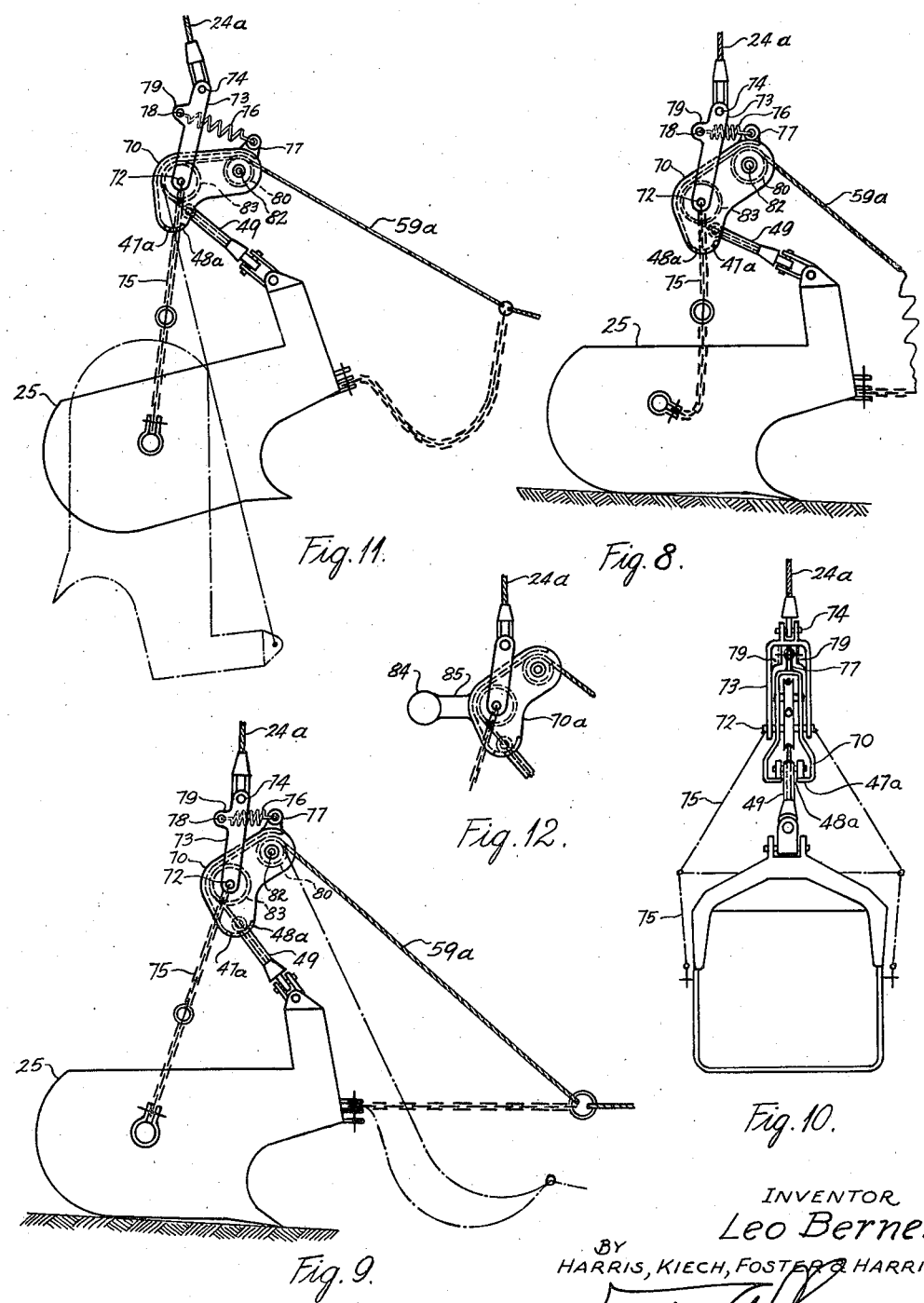

2,168,643

UNITED STATES PATENT OFFICE 2,168,643

DRAG BUCKET CONTROL

Leo Berner, Huntington Park, Calif.

Application March 22, 1938, Serial No. 197,354

15 Claims. (Cl. 37—135)

My invention relates to excavating devices, particularly drag buckets and is directed specifically to an improved drag bucket hoisting and dumping control.

Drag buckets of the type to which my invention relates are adapted to be operated in conjunction with a drag line excavator. In portable excavating apparatus a swinging boom is employed, the boom being mounted on caterpillars that carry the power plant for manipulating the drag bucket and the boom. In the typical operation of such an apparatus the drag line excavator stands at the top of a slope on the edge of the area being excavated with the boom extending over the area. The bucket is pulled toward the drag line excavator by a drag line, the leading edge of the bucket digging into and loosening the soil, the loosened soil being shoved into the bucket. The filled bucket in load-carrying disposition is elevated by a hoist line suspended from the outer end of the boom and is carried by swinging action of the boom to a dumping zone where the bucket is rotated to a dumping position.

My invention is directed to the means for controlling the drag bucket with respect to its functions of carrying and then dumping a load of earth. A drag bucket of the type involved here is pivotally supported from the hoist line at an axis rearward of the bucket's center of gravity about which axis the bucket rotates between a load-carrying position and a dumping position, the control of the bucket residing in means for supporting the front end of the bucket from the hoist line. In the most common arrangement the forward end of the bucket is controlled by flexible means passing over a sheave carried by the hoist line, the flexible means being connected to the drag line of the bucket, the bucket being held in load-carrying disposition by tension in the drag line and being released for dumping by slackening of the drag line.

When an empty drag bucket of the conventional type is returned to the excavation area, usually the swinging action of the boom has a centrifugal effect that lands the bucket in the excavating zone beyond the boom point, i. e., the outer end of the boom. Under favorable conditions the subsequent movement of the drag bucket under the action of the drag line will cause the bucket to be filled even before it is pulled as far as the boom point. It would be desirable in such an event to begin hoisting the bucket when it reaches the boom point or before, but the usual control arrangement described will not permit hoisting of the bucket until it is dragged a substantial distance inside of the boom point. The tension in the drag line required to support the forward end of the bucket must be balanced by tension in the hoist line, and such equilibrium may be had only if the hoist line is inclined in opposition to the drag line.

The principal object of my invention is to provide a control that will operate regardless of the disposition of the bucket with respect to the boom point so that the bucket may be hoisted from positions beyond the boom point equally as well as from positions inside the boom point. By my invention the range of operation from a particular drag line excavator position is materially increased so that a given area may be excavated from relatively few excavator positions. Another and more important advantage of my control arrangement is that the excavating cycle may be drastically shortened in time, because I eliminate the necessity of dragging the bucket after it is filled, and, further, because by virtue of my arrangement, the operation of elevating the bucket from its lowermost position and the operation of swinging the bucket to the dumping zone may be performed simultaneously to a greater extent than possible with the usual arrangement.

Another object of my invention is to provide a positive latch operative beyond the forward end of the bucket and the hoist line to hold the bucket in load-carrying disposition without the necessity for tension in the drag line. It will be apparent to those skilled in the art, then, that in addition to saving time, my invention saves power, since I eliminated both unnecessary dragging of the bucket and any necessity for placing the drag line under tension to hold the bucket in load-carrying disposition.

A further object of my invention is to provide such a latch constructed to be moved into automatic engagement with the forward end of the bucket in response to initial elevation of the hoist line when the full bucket rests on the ground. A feature of my invention is that means for guiding the latch in its engaging action is inherent in my construction, as will be apparent in my later detailed description.

While my latch means may be released by any remotely controlled means, such as a separate release line leading to a central power plant, one of the objects in certain forms of my invention is to arrange for the drag line connected to the bucket to have the two functions of dragging the bucket in the filling operation and of releasing the latch at the dumping zone. In this respect my invention is characterized by the conception of a drag line having a release line branching therefrom of such dimension and disposition that when the drag line is horizontal or inclined downward toward the bucket, tension on the drag line is transmitted directly to the front end of the bucket and when the drag line slopes upward toward the bucket, tension on the drag line is transmitted primarily to the release line.

The latch means employed in my invention for supporting the front end of the bucket from the hoist line comprises a member pivotally connected to the hoist line to rotate into and out of engaging disposition. In one form of my invention I provide a yielding means such as a spring or a counterweight tending to rotate the latch into its engaged position, but in another form of my invention it is my object to accomplish the same purpose by connecting the rearward bucket supporting means to the latch in a manner to provide the same rotative effect. In this latter construction the latch means provides a point of attachment for the bucket-supporting means at the rear end of the bucket and this rearward bucket-supporting means has the additional function of cooperating in the latching operation. The rearward bucket-supporting means in such a construction is connected to the latch rearwardly of the latch axis and the means for releasing the latch is connected thereto forward of the latch axis, so that the turning moments exerted on the latch by the rearward bucket-supporting means and the release means respectively are opposite to each other. A feature of this form of my invention is the conception of adapting the latch means for pivotal connection with the hoist line at any one of a plurality of points on the latch whereby the relationship between the two opposite moments on the latch means may be varied at will.

One feature of prior art devices in which the front end of the bucket is supported in the load-carrying position by tension in the drag line is that the dumping movement of the bucket may be controlled by the drag line. Such control favors a smooth dumping action. A problem in arranging a positive latch for holding the drag bucket in load-carrying disposition is to provide a smooth and controlled dumping action when the latch is disengaged. One of the important objects of my invention is to provide such dumping control in conjunction with a positive latch. In this respect my invention is characterized by the conception of arranging a drag line both to release the positive latch and to take over the support of the front end of the bucket, these functions being timed closely together. An important advantage of such a construction is that I may arrange the function of transferring the load from the latch to the drag line to be initiated in advance of the release of the latch so that a preliminary lessening of the load on the latch will be achieved not only to make the releasing action easier but also to reduce wear on the latch. This latter object of my invention is accomplished by running the release line over a sheave on the latch member and connecting the line to the forward end of the drag bucket so that tensioning of the release line to exert the required moment on the latch means simultaneously places some of the weight of the bucket on the tension of the drag line.

The above and other advantages of my invention will be apparent from the detailed description to follow, considered with the accompanying drawings.

In the drawings:

Fig. 1 is a diagrammatic view of a typical portable excavating apparatus incorporating my invention;

Fig. 2 is a side elevation of one form of my invention showing the latch disengaged at the beginning of the dumping action;

Fig. 3 is a front elevation of the bucket with the latch engaged;

Fig. 4 is a side elevation of the bucket latched and ready to be hoisted;

Fig. 5 is a bottom plan view of the latch;

Fig. 6 is a plan view of the supporting means for the front end of the bucket that is engaged by the latch;

Fig. 7 is a side elevation of said supporting means;

Fig. 8 is a second form of my invention showing the latch being automatically moved into engagement by the hoisting operation;

Fig. 9 shows the second form of my invention latched and ready to be hoisted;

Fig. 10 is a front elevation of the bucket showing the latch of Fig. 9 in latched position;

Fig. 11 is a side elevation showing the latch of Fig. 9 unlatched at the beginning of the dumping operation; and Fig. 12 is a side elevation of a modification of the latch of Fig. 9.

Fig. 1 shows diagrammatically a drag line excavator incorporating the principles of my invention, the apparatus including a crawler frame 20 supporting a revolving frame 21 carrying a boom 22. At the outer end of the boom is a hoist sheave 23 marking what may be conveniently termed the "boom point", from which a hoist line 24 is suspended for transporting a drag bucket 25. The centrifugal force incidental to the swinging of the boom from a dumping zone to the excavating area, or a pendulum action induced through the drag line, may land the bucket beyond the boom point as far, for example, as the dotted line position indicated at 26. The bucket is dragged forward by a drag line 27 and may be filled by the time it reaches the bottom of the slope 28 at position 29, which position, it will be noted, is still beyond the boom point, so that the hoist line slopes toward the excavator. Where a conventional type of drag bucket control is employed, the bucket must be pulled up the slope to approximately the position 30 with the hoist line sloping away from the excavator at a substantial angle before the bucket can be hoisted. In my invention, however, the bucket may be hoisted at any point desired between positions 29 and 30. In an operation such as stripping coal, it is desirable that the bucket contain only material from the floor of the excavation and not extraneous material from the slope 28, in which case the bucket would be hoisted from the position 29.

The bucket 25 shown in Figs. 2, 3, and 4 has a leading cutting edge 32 which digs into the soil when the bucket is pulled forward by the drag line 27. The drag line is connected to the bucket by a pair of drag chains 33 that diverge to a pair of spaced shackles 34 on the front of the bucket.

The means for supporting the bucket from the hoist line 24 includes a pair of spreader chains 35 that diverge to the ends of a spreader bar 36. The spreader chains terminate in trunnion links 37 rotatably embracing a pair of trunnions 38 rearward of the center of gravity of the bucket, which trunnions provide pivot points about which the bucket rotates from the load-carrying position shown in full lines of Fig. 2 to the dumping position indicated by dotted lines.

In the preferred form of my invention a member 39 pivotally mounted for rotation on the end of the hoist line 24 serves both as means for connecting the spreader chains 35 to the hoist line and as latch means for releasably connecting the hoist line with the bucket forwardly of the bucket's center of gravity. This latch member 39 has a plurality of holes 40 through any one of which may extend a pivot pin 42 carried by a clevis 43 at the end of the hoist line, the hole engaged by the pivot pin 42 determining the axis about which the latch member rotates into and out of engaged position. The spreader chains may be connected to the latch member in any suitable manner. In the preferred form of my invention the connection is rearward of the pivotal point of the axis so that the weight of the rear end of the bucket creates a moment tending to rotate the latch into engaged position. The drawings show the latch member provided with a pair of integral ears 44 rearward of the pivot holes 40, the ears being apertured to receive pins 45 carried by clevises 46 at the upper ends of the spreader chains 35.

The latch member 39 may be in the form of a stirrup with an arcuate bottom wall 47 having a latching slot 48. The connecting means or supporting means at the forward end of the bucket for releasable engagement with the latch member may comprise an arm or link 49 constructed as shown in Figs. 6 and 7. The arm 49 has a shank 50 adapted to slide into the latch slot 48 and has a pair of rollers 52 adapted to roll into engagement with the bottom wall 47 of the latch member. The arm 49 is pivotally mounted on the usual arch 53 spanning the front end of the bucket, preferably by a universal joint. Thus, the lower end of the arm may be formed with a loop 54 to receive a pin 55 carried by a shackle 56, the shackle being in turn rotatably carried by a pin 57 mounted in a bracket 58 on the arch of the bucket.

To create a moment for rotating the latch member 39 out of its engaged position, a release line 59 is operatively connected with the latch member at a point forward of the axis about which the latch member rotates. The release line may be a separate cable to the power means of the excavator, but a feature of my invention is that the release line may simply branch from the drag line as indicated by the drawings. While the release line may terminate at the latch member to serve the purpose of rotating the latch member toward its disengaged position, I prefer to pass the release line over a sheave 60 rotatably mounted on a pin 62 at a point necessary to provide the required moment, and to connect the release line with the forward end of the drag bucket, so that placing the release line under sufficient tension will reduce the load of the bucket on the latch member and simultaneously rotate the latch member toward disengaged position. Instead of connecting the release line directly to the bucket, I connect it to the outer end of the latch arm 49, the latch arm being provided with an axial bore 63 and tapered socket 64 to receive and retain the leaded end of the line.

The operation of my drag bucket control may be understood from the foregoing description. When the bucket is full, say at the position 29 in Fig. 1, the hoist line is elevated for the purpose of transporting the bucket. The initial movement of the hoist line automatically brings the latch member 39 into engagement with the latch arm 49 to hold the bucket in load-carrying position. The automatic latching action may be understood by reference to Fig. 2 showing the disposition by the various cooperating parts at the beginning of the latching movement.

A feature of my invention is that the release line 59 as well as the two spreader chains 35 tend to guide the cooperating latch members into engagement. Thus, the release line 59, even though the drag line 27 is slack, is effective to hold the latch arm 49 in the upwardly inclined disposition shown and also tends to align the latch member 39 for such engagement; while the spreader chains 35, by virtue of their diverging disposition, tend to centralize the latch member and to cooperate with the release line to align and guide the latch member.

As the hoist line continues to rise from the position shown in Fig. 2, the spreader chains serve as means to fulcrum the rear end of the latch member 39, causing the latch member to rotate about the pivot pin 42 causing the bottom wall 47 to rotate edgewise toward the latch arm 49, the shank of the arm passing into the slot 48 and the rollers moving into engagement with the bottom wall 47, the position of the parts in latched position being indicated by Fig. 4.

Continued elevation of the hoist line 24 lifts the drag bucket from the ground in latched disposition, the upward movement of the bucket being continued as the boom 22 swings to the dumping zone. When the bucket rests on the ground prior to its elevation, the disposition of the drag rope will be horizontal, as shown in Fig. 4, if the excavating surface is approximately at the same level as the excavator, or will slope downward toward the bucket, as indicated in Fig. 1, if the elevating surface is substantially lower than the tractor. In either case, the length and disposition of the release line 59 is such that tension on the drag line 27 is transmitted primarily to the bucket itself rather than to the release line. When the bucket is at an elevated position ready to be dumped, however, the drag line slopes upward toward the bucket, as indicated in Fig. 2, so that any tension on the drag line is transmitted directly to the release line 59 rather than to the drag chains 33.

To cause the bucket to dump, then, it is merely necessary for the operator to place the elevated drag line under sufficient tension to cause the weight of the front end of the bucket to be transferred to the release line, which transfer of weight rotates the latch member out of engagement, as indicated in Fig. 2, whereupon the bucket may be dropped to its dumping position at a controlled rate by merely playing out the drag line. That placing the release line under tension causes a force corresponding to twice that tension to be exerted on the latch member through the sheave pin 62 accounts for the positive manner in which the latch member rotates out of engagement and remains out of engagement even when the drag line is slackened to permit the downward swing of the bucket.

In the second form of my invention shown in Figs. 8 to 11, where corresponding numbers are used to indicate elements identical with elements previously described, a latch member 70 is rotatably mounted on a pin 72 in a clevis 73 at the end of the hoist line 24a, the clevis being pivotally connected to the hoist line by a suitable pin 74. Instead of connecting the spreader chains 75 of the bucket to the latch member for the purpose of rotating the latch member toward engaged position, I connect the spreader chains to the opposite ends of the pin 72 and depend upon yielding means such as a spring 76 to provide the required tendency for the latch member to rotate toward engaged positions. The drawings show this spring interconnecting an ear 77 on the latch member and a pin 78 mounted in a pair of ears 79 on the clevis 73. The latch member 70 has an arcuate bottom wall 47a and slot 48a to engage the latch arm 49 at the forward end of the bucket in the manner previously described.

In this construction the release line 59a passes over a sheave 80 mounted on a pin 82 on the forward portion of the latch member and then passes over a sheave 83 mounted on the pivot pin 72. It is apparent that the tension of the release pin has only approximately half as much rotative effect on the latch member as in the first form of my invention, but less release force is required since the release movement is opposed only by the spring 76.

The operation of this second form of my invention may be readily understood from the drawings and the previous description. As the hoist line is elevated with the parts disposed as shown in Fig. 8, the latch moves into automatic engagement, as shown in Fig. 9, so that the bucket in load-carrying disposition may be elevated and transported to the dumping zone. When the drag line is placed under tension, pulling the release line taut, the latch member 70 is rotated out of engagement with the latch arm 49, as indicated in Fig. 11, so that the bucket may then be dumped as before by merely playing out the drag line.

In Fig. 12 I show a latch member 70a provided with a counterweight 84 on an integral counterweight arm 85, the counterweight replacing the spring 76 and serving the same purpose.

For the purpose of this disclosure and to illustrate the principles involved in my conception I have disclosed preferred forms of my invention in specific detail, but those skilled in the art will recognize that substantial changes and modifications may be made without departing from the spirit of my invention; I reserve the right to all such changes and modifications that properly come within the scope of my appended claims.

I claim as my invention:

1. In an excavating apparatus, the combination of: a drag bucket; a drag line connected to the bucket; a hoist line for transporting the bucket; means interconnecting said hoist line and bucket rearwardly of the center of gravity of the bucket; means carried by said hoist line for releasably interconnecting said hoist line and the bucket forwardly of the center of gravity of the bucket, said forward interconnecting means being disposed to make such connection automatically when the hoist line is initially elevated with the bucket on the ground and the drag line slack; and means operatively connected with the drag line to release said forward interconnecting means when the drag line is tensioned, thereby to cause the bucket to drop to dumping position.

2. In an excavating apparatus, the combination of: a drag bucket; a drag line connected to the bucket; a hoist line for transporting the bucket; means interconnecting said hoist line and bucket rearwardly of the center of gravity of the bucket; a connecting member secured to the bucket forwardly of the center of gravity of the bucket; latch means carried by the hoist line for releasably engaging said connecting member when the hoist line is initially elevated with the bucket resting on the ground, to hold the bucket in load-carrying position; and flexible means interconnecting said drag line and connecting member and threaded through said latch means to guide the engaging action of the latch means and connecting member when the hoist line is initially elevated and to release the latch means by force transmitted from the drag line to dump the bucket at an elevated position.

3. In an excavating apparatus, the combination of: a drag bucket; a drag line connected to the bucket; a hoist line for transporting the bucket; means interconnecting said hoist line and bucket rearwardly of the center of gravity of the bucket; a connecting member secured to the bucket forwardly of the center of gravity of the bucket; latch means carried by the hoist line for releasably engaging said connecting member; and flexible means interconnecting said drag line and connecting member and threaded through said latch means, said flexible means being of such length and being connected to the drag line at such distance from the bucket as to favor said engaging action of the latch means when the drag line is tensioned in horizontal or an upwardly inclined position with the bucket resting on the ground and to release said latch means when the drag line is tensioned in downwardly inclined disposition with the bucket elevated.

4. In an excavating apparatus, the combination of: a drag bucket; a drag line connected to the bucket; a hoist line for transporting the bucket; means interconnecting said hoist line and bucket rearwardly of the center of gravity of the bucket; a connecting member secured to the bucket forward of the center of gravity of the bucket; pivoted means carried by said hoist line to rotate between a position engaging said connecting member for supporting the bucket in load-carrying position to a position out of such engagement, said pivoted means being constructed and arranged with an inherent tendency to rotate to engaging position whereby such engagement may be effected by initially elevating the hoist line with the bucket resting on the ground; and means operatively interconnecting the drag line and said pivoted means to rotate said pivoted means out of such engagement for dumping the bucket.

5. In an excavating apparatus, the combination of: a drag bucket; a drag line connected to the bucket; a hoist line for transporting the bucket; a hoist block pivotally connected to the hoist line for rotation about a transverse axis; means interconnecting said block and drag line to rotate the block about said axis; means interconnecting said hoist block and bucket rearward of the center of gravity of the bucket to cause opposite rotation of the block; and means operated by said block for releasably interconnecting said block and the bucket forward of the center of gravity of the bucket, said block being constructed and arranged to rotate and thereby move said last-named means into engagement when the hoist line is elevated with the drag line slack and to rotate in the opposite direction to move said last-named means out of engagement when said drag line is subsequently tensioned.

6. In an excavating apparatus, the combination of: a drag bucket; a connecting means mounted on the bucket; a hoist line pivotally connected with said bucket for transporting the bucket; latch means carried by the hoist line and adapted to move into releasable engagement with said connecting means to hold said bucket in load-carrying position; means to yieldingly hold said latch means in its engaged position; a drag line connected to the bucket; and a release means operatively interconnecting said drag line and latch means to move said latch means out of engagement when the drag line is tensioned with the drag bucket at an elevated position.

7. In an excavating apparatus, the combination of: a drag bucket; a connecting means mounted on the bucket; a hoist line for transporting the bucket; pivoted latch means carried by the hoist line and adapted to rotate into and out of engagement with said connecting means; a second connecting means between the bucket and latch means transmitting part of the load of the bucket to the latch means in a direction offset from the pivot point of the latch to hold said latch means in engagement with the first-mentioned connecting means; and a release line operatively connected with said latch means to rotate the latch means in opposition to said load out of engagement for dumping of the bucket.

8. In an excavating apparatus, the combination of: a drag bucket; a connecting means mounted on the bracket; a hoist line for transporting the bucket; latch means carried by the hoist line and adapted to move into and out of engagement with said connecting means; means to yieldingly hold said latch means in its engaged position with sufficient effectiveness to withstand the weight of the loaded bucket; a drag line connected to the bucket; and means branching from the drag line to said latch means to operate in tension to release said latch in opposition to said yielding means, said branching means being of such length and disposition that tension from the drag line is transmitted primarily to the bucket when the drag line slopes downward towards the bucket and is transmitted primarily to the latch means when the drag line slopes upward to the bucket.

9. In an excavating apparatus, the combination of: a drag bucket; a connecting means mounted on the bucket; a hoist line for transporting the bucket; a latch means pivotally carried by the hoist line to rotate into and out of engagement with said connecting means; a second connecting means from the bucket connected to said latch means at a point to create a moment tending to rotate said latch means into engaged position; and a release means connected to said latch means at a point to create an opposite moment, said latch means being adjustable with respect to said moments.

10. In an excavating apparatus, the combination of: a drag bucket; a connecting means mounted on the bucket; a hoist line for transporting the bucket; a latch means pivotally carried by the hoist line to rotate into and out of engagement with said connecting means; means to yieldingly hold said latch means at its engaged position; a drag line connected to the bucket; and means branching from said drag line to an operative connection with said latch means at a point to create a moment tending to rotate the latch means out of its position of engagement, said branching means being of such length and disposition that tension from the drag line is transmitted primarily to the bucket when the drag line slopes downward towards the bucket and is transmitted primarily to the latch means when the drag line slopes upward to the bucket, whereby the bucket when elevated may be released for dumping by placing said drag line under tension.

11. In an excavating apparatus, the combination of: a drag bucket; a drag line connected to the bucket; a hoist line pivotally connected to the bucket to permit the bucket to swing between a load-carrying position and a dumping position; and means operative between the bucket and hoist line to releasably hold the bucket in its load-carrying position, said means being releasable in response to tension on said drag line.

12. In an excavating apparatus, the combination of: a drag bucket; a drag line connected to the bucket; a hoist line for transporting the bucket; means pivotally connecting the drag bucket rearwardly of its center of gravity to the hoist line to permit the drag bucket to swing between a load-carrying position and a dumping position; means to releasably connect the drag bucket forwardly of its center of gravity to the hoist line; and means responsive to tension on the drag line to release said forward connecting means and to place the load thereof on the drag line.

13. In an excavating apparatus, the combination of: a drag bucket; a drag line connected to the bucket; a hoist line for transporting the bucket; means pivotally connecting the drag bucket rearwardly of its center of gravity to the hoist line to permit the drag bucket to swing between a load-carrying position and a dumping position; connecting means mounted on the drag bucket forwardly of its center of gravity; a latch means pivotally carried by the hoist line to rotate into and out of engagement with said connecting means; a sheave carried by said latch means; and a release line passing over said sheave having one end connected to said drag line and the other end connected to said bucket forwardly of its center of gravity, said sheave being so located relative to the pivotal point of said latch means that when said release line is placed under tension by the drag line thereby transferring a portion of the bucket load to the sheave, said latch means is rotated out of latching position.

14. In an excavating apparatus, the combination of: a drag bucket; a drag line connected to the bucket; a hoist line for transporting the bucket; means pivotally connecting the drag bucket rearwardly of its center of gravity to the hoist line to permit the drag bucket to swing between a load-carrying position and a dumping position; connecting means mounted on the drag bucket forwardly of its center of gravity; a latch means pivotally carried by the hoist line to rotate into and out of engagement with said connecting means; a sheave carried by said latch means; and a release line passing over said sheave having one end connected to said drag line and the other end connected to said bucket forwardly of its center of gravity, said sheave being so located relative to the pivotal point of said latch means that when said release line is placed under tension by the drag line, thereby transferring a portion of the bucket load to the sheave, said latch means is rotated out of latching position, said release line being of such length and disposition that tension from the drag line is transmitted to the bucket when the drag line slopes downward towards the bucket and is transmitted to the release line when the drag line slopes upward to the bucket.

15. In an excavating apparatus, the combination of: a drag bucket; a hoist line for transporting the drag bucket; a member pivotally connected to the hoist line to rotate about an axis; supporting means interconnecting the bucket rearwardly of its center of gravity with said pivoted member rearwardly of said axis; a second supporting means interconnecting said bucket forwardly of its center of gravity and said pivoted member forwardly of said axis, said second supporting means being releasable in response to rotation of said pivoted member; and release means to exert force on said pivoted member at a point forward of said axis to cause rotation of the pivoted member about said axis to thereby release said second supporting means, said pivoted member being adapted for pivotal connection with said hoist line at any one of selected points on the pivoted member whereby the rotative effects on said pivoted member of said first support means and said release means may be selectively varied.

LEO BERNER.

CERTIFICATE OF CORRECTION.

Patent No. 2,168,643. August 8, 1939.

LEO BERNER.

It is hereby certified that error appears in the printed specification of the above numbered patent requiring correction as follows: Page 1, second column, line 36, for the word "eliminated" read eliminate; page 4, first column, line 20, for "pin" read line; page 5, first column, line 30, claim 8, for "bracket" read bucket; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.